July 1, 1924.
A. BADOWSKI
1,499,327
PRESSURE GAUGE FOR TIRES
Filed Oct. 29, 1920
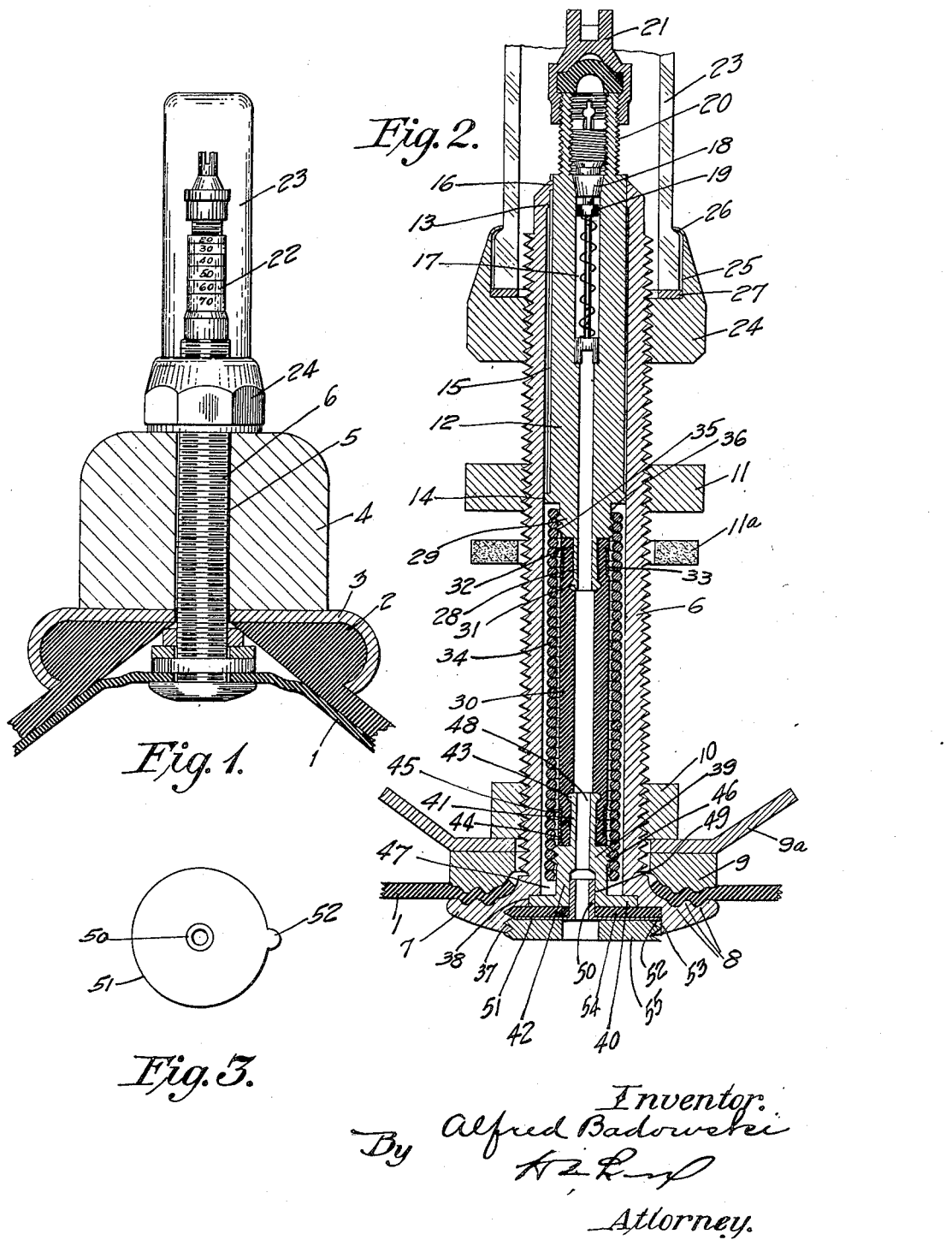

Patented July 1, 1924.

1,499,327

UNITED STATES PATENT OFFICE.

ALFRED BADOWSKI, OF CHARLESTON, WEST VIRGINIA. ASSIGNOR, BY MESNE ASSIGNMENTS, TO TIREGAGE VALVE CORPORATION, OF CHARLESTON, WEST VIRGINIA, A CORPORATION OF WEST VIRGINIA.

PRESSURE GAUGE FOR TIRES.

Application filed October 29, 1920. Serial No. 420,511.

*To all whom it may concern:*

Be it known that I, ALFRED BADOWSKI, a citizen of the United States, residing at Charleston, in the county of Kanawha and State of West Virginia, have invented new and useful Improvements in Pressure Gauges for Tires, of which the following is a specification.

In the making of pressure gauges for use particularly in pneumatic tires the connections must be absolutely tight so as to prevent any leakage from the tire and in order to accomplish this purpose it has been common to provide the gauge with a rubber tube through which the tire might be inflated, the rubber tube permitting of an expansion under pressure indicating the tire pressure. Difficulty has been experienced in securing the ends of this tube so as to avoid injury. In building up the structure springs have been used and the anchoring of these springs has involved some difficulty. The present invention is directed to the correction of the defects mentioned as well as other details which will appear from the specification and claims.

The invention is illustrated in the accompanying drawings as follows:—

Fig. 1 shows a section through a wheel rim and tire with the gauge in place.

Fig. 2 a central section through the pressure gauge.

Fig. 3 a plan view of a nipple for a sealing washer.

1 marks the tire tube, 2 the tire, 3 the wheel rim, 4 a felloe, and 5 an opening through the felloe for the valve stem.

The valve stem 6 is in the form of a sleeve and is screw threaded on its outer surface. It is provided with a head 7 at its inner end, the upper surface of the head having the annular grooves and ribs 8. A washer 9 with corresponding groves and ribs is arranged above the tube and the washer is clamped in position by a nut 10. The usual separating plate 9ª is arranged over the washer 9 and the whole is clamped in place by a nut 10ª. The usual washer 11ª and nut 11 are provided for securing the parts on the felloe.

A plunger 12 is slidingly mounted in the outer end of the stem. The outer end of the stem has an inwardly extending shoulder 13 which is arranged to engage a shoulder 14 on the inner end of the plunger thus preventing the blowing out of the plunger. The plunger has a key slot 15 into which a key on the stem extends locking the plunger against turning.

The plunger has an opening 17 through it. An inflation valve member 18 is secured in the usual manner in the opening 17 and is provided with a valve 19 operating on the member in the usual manner. The outer end of the plunger is screw-threaded at 20 to receive the pump connection and the usual cap 21 is secured on this screw thread.

The plunger has the graduations 22 which are exposed as the plunger rises above the stem so as to indicate the pressure of the tire. A transparent cap 23 encloses the plunger. It is secured in a base 24, the base having a socket 25 into which the transparent cap extends and the upper edge of the socket is turned inwardly on a shoulder on the bottom of the cap to secure it in place. A yielding washer 27 is provided at the bottom so as to relieve the pressure at this point. In this way a glass cap may be used without breakage, the base carrying the screw thread by means of which the cap may be secured on the stem 6.

The plunger has the stepped extension with the steps 28 and 29. A rubber tube 30 is arranged over the step 28. An annular shoulder 31 is arranged at the lower end of the step 28 and the tube 30 is provided with a shoulder 32 at its upper end. A wrapping 33 is placed around the tube back of the shoulder 31 and under the shoulder 32, thus fully securing the rubber tube in place.

A spring 34 is arranged outside of the tube 30. The step 29 has a screw thread 35 onto which the spring 34 is screwed. The step 29 is extended beyond the thread at 36 thus permitting of an adjustment of the plunger in the screw. This is desirable in the assembling of the device because it is difficult to get springs of the same strength and by testing the device prior to assembling in the sleeve the length of the spring may be adjusted to make the graduations register correctly. This method of securing the rubber and spring to the plunger is in a general way one that has been heretofore successfully used. I am able by my invention to provide the same sort of anchorage for the inner end of the tube and spring. A screw threaded socket 37 extends inwardly from the inner end of the face 7. It has a smaller socket 38 extending from the floor of the socket. An anchor plate 39 is arranged in the socket 38. This plate has a flange 40 which fits into the socket 38 and it has the stepped extensions 41 and 42 similar to the stepped extensions 28 and 29. The extension 41 has an annular shoulder 43 at its upper end and the lower end of the rubber tube has a shoulder 44. A wrapping 45 is arranged around the tube under the shoulder 43 and above the shoulder 44, thus securing the lower end of the rubber tube. Rubber cement may be used in connection with the wrapping at both the upper and lower ends of the tube for securing the tube on the steps. The step 42 is provided with a screw thread 46 on which the lower end of the spring is screwed. The step 42 has the free space 47 for the adjustment of the spring. Thus a wide range of adjustment is provided on both the steps 29 and 42. Further it will be noted that both the spring and the rubber have both ends alike, thus simplifying the manufacture of these parts.

The anchor plate has an opening 48 through it and this is provided with an enlargement 49. An expanding nipple 50 extends into the enlargement and the nipple has a flange 51. The flange is keyed in the socket by means of a tongue 52 extending into a groove 53 in the wall of the socket. A sealing washer shaped gasket of rubber extends over the entire floor of the socket and is of such thickness that when compressed it expands against the side walls of the socket so as to thoroughly seal all joints leading from the socket. The nipple 50 extends through this rubber gasket to prevent the closing of the opening through this rubber gasket as it is compressed. A screw plate 55 is screwed into the socket against the flange 51 for compressing the rubber in place.

It will be noted that when the plunger, spring, tube and anchor plate are assembled they may be inserted into and withdrawn from the inner end of the stem. This simplifies the manufacture of the stem and provides for a simple assembly with proper stops at the outer end of the stem for the plunger.

What I claim as new is:—

1. In a pressure gauge for tires, the combination of a stem sleeve having a head at its inner end in which there is a socket extending from the inner face; a plunger in the sleeve; an inflation valve in the plunger; a rubber tube secured to the plunger; a spring secured to the plunger; an anchor plate in the socket; and means for securing the tube and spring to the plate, the assembled plunger, tube, spring and plate being adapted to be inserted from the inner end of the stem sleeve.

2. In a pressure gauge for tires, the combination of a stem sleeve having a head at its inner end in which there is a socket extending from the inner face; a plunger in the sleeve; an inflation valve in the plunger; a rubber tube secured to the plunger; a spring secured to the plunger; an anchor plate in the socket; means for securing the rubber tube to the anchor plate; means for securing the spring to the anchor plate; a sealing gasket on the floor of the socket; and a screw in the socket operating on the gasket.

3. In a pressure gauge for tires, the combination of a stem sleeve having a head at its inner end in which there is a socket extending from the inner face; a plunger in the sleeve; an inflation valve in the plunger; a rubber tube secured to the plunger; a spring secured to the plunger; an anchor plate in the socket; means for securing the rubber tube to the anchor plate; means for securing the spring to the anchor plate; a sealing gasket on the floor of the socket; a nipple extending into the center of the sealing gasket to prevent the closure thereof; and a screw in the socket operating on the gasket.

4. In a pressure gauge for tires, the combination of a stem sleeve having a head at its inner end in which there is a socket extending from the inner face with a smaller socket in the floor thereof; a plunger in the sleeve; a rubber tube secured to the plunger; a spring secured to the plunger; an anchor plate having a flange arranged in the smaller socket; a stepped extension on which the tube and spring are secured; a sealing gasket in the floor of the socket over the anchor plate, and a screw plate operating on the sealing gasket.

In testimony whereof I have hereunto set my hand.

ALFRED BADOWSKI.